US012688690B2

(12) United States Patent
Jiang et al.

(10) Patent No.: US 12,688,690 B2
(45) Date of Patent: Jul. 21, 2026

(54) DIFFUSION MODELING BASED SUBSURFACE FORMATION EVALUATION

(71) Applicant: Landmark Graphics Corporation, Houston, TX (US)

(72) Inventors: Fan Jiang, Houston, TX (US); Konstantin Osypov, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 294 days.

(21) Appl. No.: 18/450,981

(22) Filed: Aug. 16, 2023

(65) Prior Publication Data

US 2024/0312202 A1      Sep. 19, 2024

Related U.S. Application Data

(60) Provisional application No. 63/490,185, filed on Mar. 14, 2023.

(51) Int. Cl.
*G06V 20/10* (2022.01)
*G06T 5/50* (2006.01)
*G06T 5/73* (2024.01)

(52) U.S. Cl.
CPC ............... *G06V 20/10* (2022.01); *G06T 5/50* (2013.01); *G06T 5/73* (2024.01); *G06T 2207/20084* (2013.01)

(58) Field of Classification Search
CPC ................... G06V 20/10; G01V 20/00; G01V 2210/6169; G01V 2210/624; G01V 2210/6244; G01V 2210/6246; G01V 2210/665; G01V 2210/667; G01V 1/306; G01V 1/50; G06T 5/50; G06T 5/73; G06T 2207/20084; G06N 20/00
See application file for complete search history.

(56) References Cited

U.S. PATENT DOCUMENTS

| | | | |
|---|---|---|---|
| 11,500,117 B1 * | 11/2022 | Tian ........................ | G01V 1/307 |
| 2011/0272161 A1 | 11/2011 | Kumaran et al. | |
| 2012/0281501 A1 | 11/2012 | Osypov et al. | |
| 2015/0362623 A1 * | 12/2015 | Miotti .................... | G01V 11/00 702/14 |
| 2018/0372896 A1 | 12/2018 | Johansen et al. | |
| 2019/0064378 A1 * | 2/2019 | Liu ........................... | G01V 1/28 |

(Continued)

FOREIGN PATENT DOCUMENTS

| | | | | |
|---|---|---|---|---|
| CN | 117075193 A | * | 11/2023 | ............... G01V 1/28 |

OTHER PUBLICATIONS

Du et al, Disentangling Noise Patterns from Seismic Images: Noise Reduction and Style Transfer, 2022 IEEE Transactions on Geoscience and Remote Sensing, 60(2022) pp. 1-14. (Year: 2022).*

(Continued)

*Primary Examiner* — Kathleen M Broughton

(74) *Attorney, Agent, or Firm* — DeLizio, Peacock, Lewin & Guerra LLP

(57) ABSTRACT

Some implementations include a method for controlling a computer to geologically characterize a space relative to a borehole. The method may include configuring a diffusion process applied to information and data about samples of reservoir parameters. The method also may include determining, via the diffusion process, a probability distribution of the reservoir parameters in the space relative to the borehole.

20 Claims, 14 Drawing Sheets

(56)  References Cited

U.S. PATENT DOCUMENTS

| | | | |
|---|---|---|---|
| 2019/0219558 A1* | 7/2019 | Villar De Andrade E Silva ........ | |
| | | | G01N 33/2823 |
| 2019/0369278 A1 | 12/2019 | Zhang et al. | |
| 2020/0217978 A1 | 7/2020 | Chen et al. | |
| 2020/0301036 A1* | 9/2020 | Ramfjord .................. | E21B 7/04 |
| 2022/0413173 A1* | 12/2022 | Jiang ........................ | G06N 3/04 |
| 2024/0069228 A1* | 2/2024 | Osypov .................... | G01V 1/30 |
| 2024/0069237 A1* | 2/2024 | Singh ....................... | G01V 1/46 |
| 2025/0163758 A1* | 5/2025 | Jiang ........................ | E21B 7/04 |

OTHER PUBLICATIONS

"PCT Application No. PCT/US2023/071278, International Search Report and Written Opinion", Nov. 28, 2023, 11 pages.
Ho, et al., "Denoising Diffusion Probabilistic Models", 34th Conference on Neural Information Processing Systems (NeurIPS 2020), Vancouver, Canada., Dec. 16, 2020, 25 pages.
Wolleb, et al., "Diffusion Models for Implicit Image Segmentation Ensembles", Medical Imaging with Deep Learning, Zürich, Switzerland, Jul. 6-8, 2022, Dec. 27, 2021, 12 pages.

* cited by examiner

700

702

704
SEISMIC
INPUT
SAMPLE 706
707
MEAN (TOTAL 100
ENSEMBLES)

708
ALEATORIC
UNCERTAINTY

710
EPISTEMIC
UNCERTAINTY

T = 5000

T = 10000

T = 20000

T = 40000

T = 80000

1200

DIFFUSION MODELING BASED SUBSURFACE FORMATION EVALUATION

BACKGROUND

Drilling and subsurface operations performed in the exploration for hydrocarbons may require information about subsurface formations and other geological aspects. During or after drilling, operators collect subsurface data. Reconstructing a subsurface formation from seismic data can be an important tool in the exploration for hydrocarbons. Conventional approaches for this reconstruction based on machine learning are to train a model to directly map subsurface formation properties to seismic images. This mapping is non-unique and corresponds to the ill-posedness of the inverse problem, i.e., there is uncertainty associated with reconstructing subsurface formation from seismic data.

BRIEF DESCRIPTION OF THE DRAWINGS

Aspects of the disclosure may be better understood by referencing the accompanying drawings.

DESCRIPTION

Figure 1:
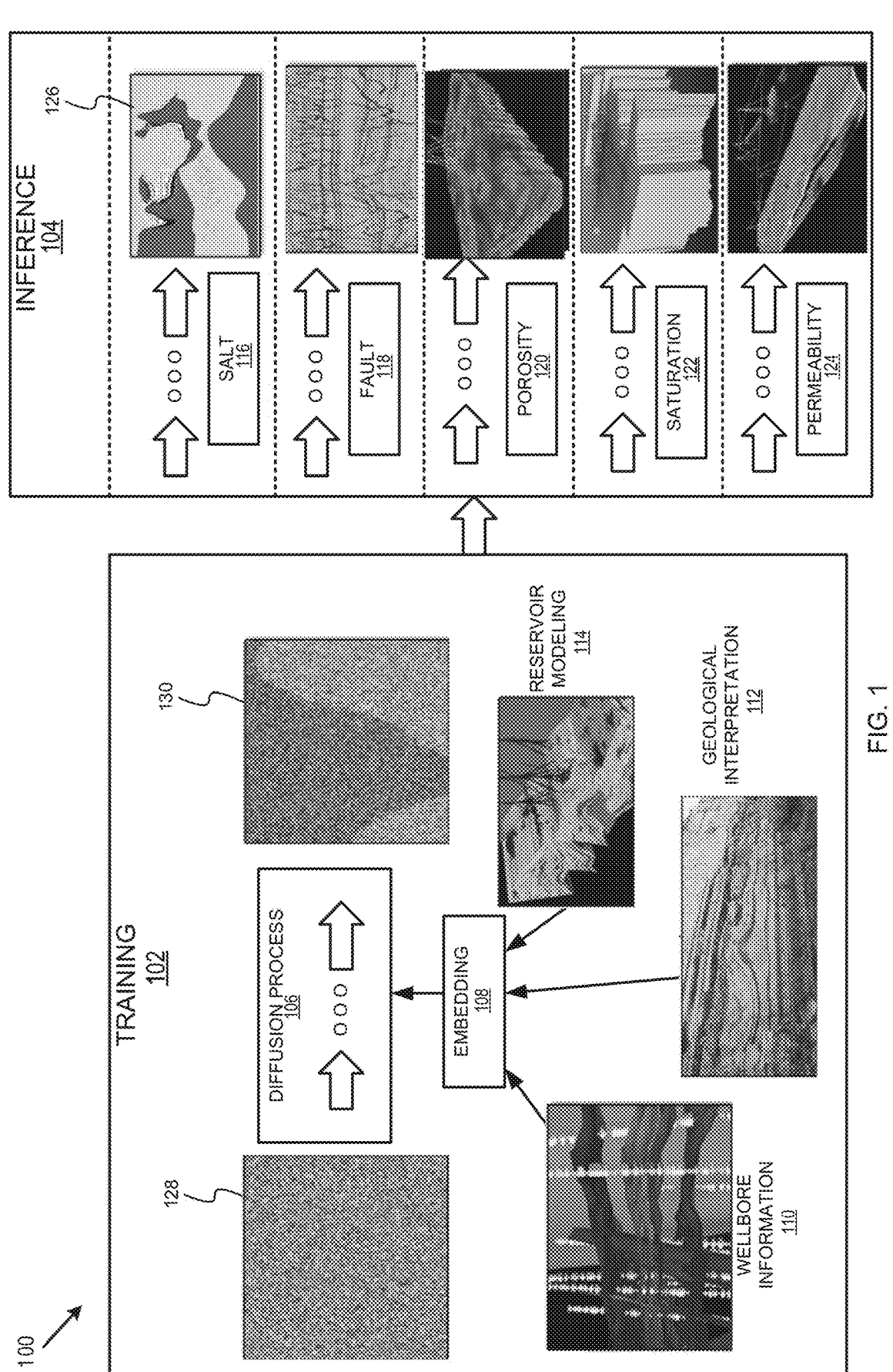
FIG. 1 is a block diagram showing example data flow for training and using a diffusion process.

The description that follows includes example systems, methods, components, and program flows used to implement aspects of the disclosure. For clarity, some well-known instruction instances, protocols, structures, and techniques may not been shown.

Overview

Exploration for hydrocarbons and other resources may entail drilling boreholes, collecting data samples from in and around the boreholes, analyzing the samples, and forming conclusions about resources in the Earth. The data samples may include seismic data collected using borehole seismic tools or other seismic means for gathering seismic information about subsurface geological structures. A borehole seismic tool may be connected to a wireline and lowered into the borehole. The borehole seismic tool may generate acoustic waves that travel through subsurface structures and reflect back to sensors of the seismic tool. The sensors may record the amplitude of the acoustic waves and time taken for the acoustic waves to reflect back to the sensors. By analyzing the time and amplitude of the reflected waves, operators may determine the depth, thickness, and characteristics of different rock layers and geological structures (such as faults, folds, and fractures). This information can be used to identify potential oil and gas reservoirs, as well as for other geotechnical and engineering purposes.

Various seismic data analysis methods include seismic image creation and processing. Creating images based on seismic data may involve seismic data processing, interpretation, and visualization. The data processing may use digital signal processing techniques, such as filtering, deconvolution, and stacking to process raw seismic data. The processing may correct for noise, correct for the effect of the wavelet used for the source, and enhance the signal-to-noise ratio. After data processing, velocity analysis may be performed to estimate the velocity of the different rock layers. This may be necessary to accurately image the subsurface structure. The processed seismic data may then be used to create an image of the subsurface structure. Images may be created using time-domain imaging or depth-domain imaging. After an image has been created, the image may be used to identify rock layers and geological structures, such as by analyzing amplitude, phase, and geometry of the reflections in the image. The interpreted seismic data may be visualized using various software tools to create 3D images and models of the subsurface structure. These images and models may be used to guide exploration and production activities, as well as for other geotechnical and engineering purposes. Hence, in some implementations, exploration and production activities may change based on results from the images and models (as described herein).

Some implementations utilize seismic image samples created from seismic data collected in the vicinity of at least one borehole. The seismic image samples may be labeled to indicate aspects of interest for reservoir parameters, such as salt content, faults, porosity, saturation, permeability, or other parameters of interest. The labeled seismic image samples may be used to train a diffusion process to make geological inferences about information (such as input seismic images) input into the diffusion process. Such geological inferences may indicate a probability distribution of reservoir parameters such as salt content, faults, porosity, saturation, permeability, and/or any other reservoir parameters of interest. Operators may perform, modify, or otherwise conduct subsurface operations based on the geological inferences generated by the diffusion process.

In some implementations, training the diffusion process may include operations for a forward diffusion. Forward diffusion may include inputting labeled seismic image samples and adding a quantity of noise (such as Gaussian noise) to each seismic image sample to form a noisy image sample. Each noisy image sample may be evaluated to determine an estimated noise quantity in the noisy image sample. Forward diffusion may determine a difference between the added noise quantity and the estimated noise quantity. This difference may be referred to as loss. Forward diffusion may be updated based on the loss. As the number of seismic image samples and loss-updates increase, forward diffusion may become better at estimating noise quantities in seismic images. After the diffusion process is trained, it may perform backward diffusion to remove noise from seismic images to infer reservoir parameters indicated in seismic input images. For example, after training, the diffusion process may receive a seismic input image and provide an output image that indicates salt content, faults, porosity, saturation, permeability, or other reservoir parameters that may be indicated in the input image. Therefore, some implementations configure a diffusion process to apply information and data about reservoir parameter samples to determine a probability distribution of reservoir parameters.
Description of Some Implementations Some implementations include a machine learning-based diffusion model for seismic interpretation. In geophysics, reconstructing the subsurface structure from seismic data may be an important inverse problem. Traditional supervised machine learning (ML) solutions may train a model to directly map subsurface formation properties to seismic images. For these traditional solutions, the generalization capability of models to the unknown measurement process could be hindered and out-of-distribution data could significantly reduce the inference accuracy from the pre-trained model. To address this issue, some implementations utilize a diffusion model as a generative model for the inverse interpretation problem, thereby quantifying uncertainty in a natural manner.

Understanding data distribution from prior knowledge may be important to building a generalized ML model. However, the probability distribution of data may be unknown in many circumstances. For example, assume each data point, x, is independent and a sampling from an unknown distribution q(X). As a generative model, some implementations of the diffusion model may construct a model $p_\theta(X)$, where $\theta$ is a learning neural network to learn $p_\theta(X) \cong q(X)$. Therefore, some implementations may be capable of generating samples of the data from $p_\theta(X)$.

FIG. 1 is a block diagram showing example data flow for training and using a diffusion process. FIG. 1 shows data flow 100 for training a diffusion process 106. During training 102, the diffusion process 106 may be embedded 108 with data and information about reservoir parameters. The data and information may include reservoir modeling information 114, geological interpretation information 112, and wellbore information 110. The embedded information 108 may configure the diffusion process 106 to detect salt, faults, porosity, saturation, permeability, or any other reservoir parameter of interest. During training 102, labeled seismic image samples may be input into the diffusion process 106, where the labels indicate geologically relevant aspects of the image samples. The diffusion process 106 may add noise to each seismic image sample and later estimate the amount of noise that was added to each seismic image sample. The diffusion process 106 may iteratively update itself based on a difference between the estimated and actual noise added to seismic image sample. As the diffusion process 106 becomes better at estimating noise in seismic images, it may make more accurate inferences 104 about reservoir parameters based on an input seismic image 128. To make an inference 104, the diffusion process 106 may remove noise from the input seismic image 128 and produce an output image 126 indicating one or more reservoir parameters of interest. For example, the output image 126 may be a segmented image indicating salt content of a subsurface space near a borehole. The diffusion process 106 may be trained to infer salt content 116, faults 118, porosity 120, saturation 122, permeability 124, or any other reservoir parameter of interest that may be indicated in the input seismic image 128. The output images may differ based on the reservoir parameter(s) of interest. For example, in some implementations, output images for salt content differ from output images for faults 118, porosity 120, saturation 122, and permeability 124. Additional details of the training process and the inference process are described herein.

Figure 2:
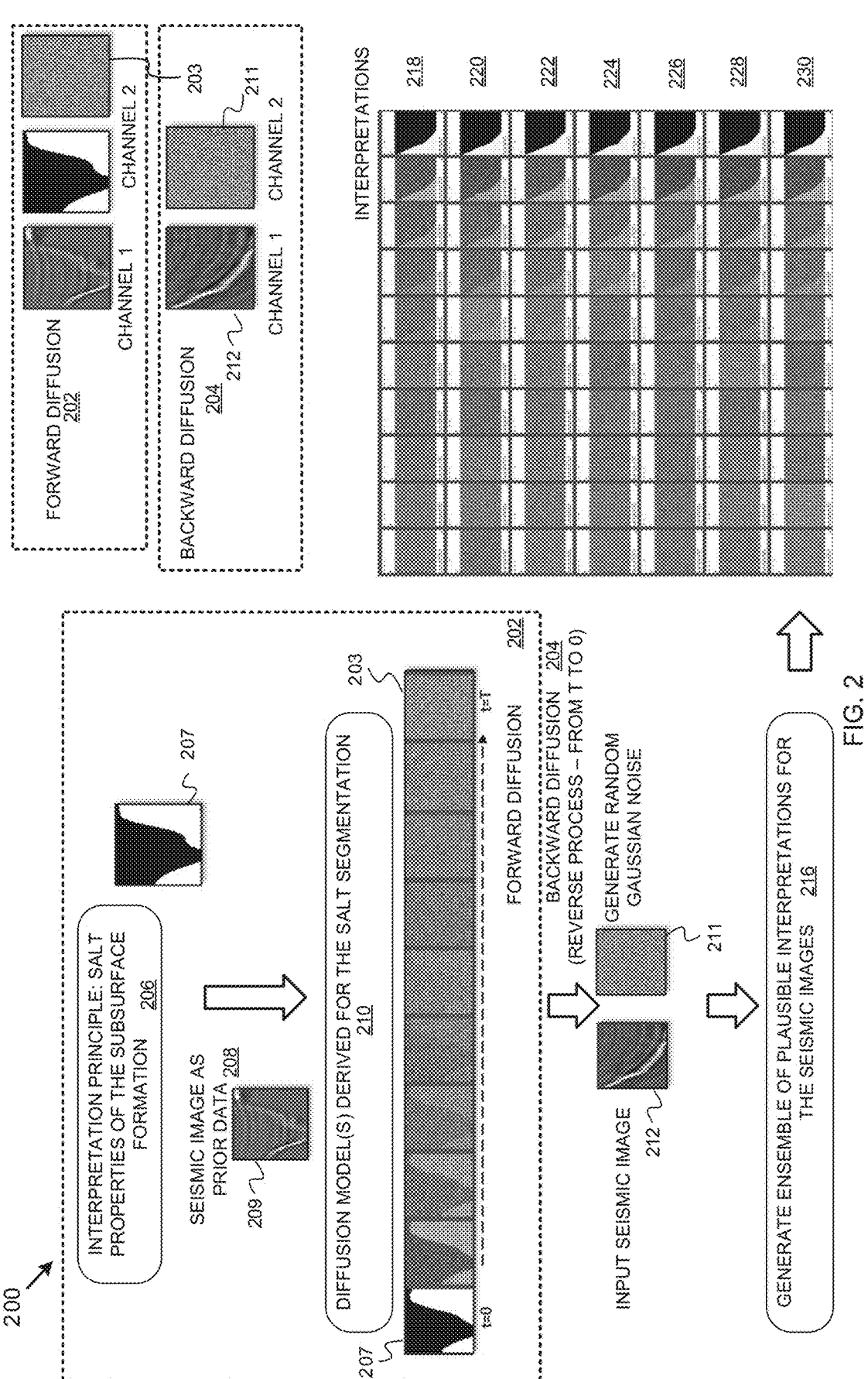
FIG. 2 is a block diagram showing example data flow and operations for an example diffusion process for estimating salt content in a subsurface space.

FIG. 2 is a block diagram showing example data flow and operations for an example diffusion process for estimating salt content in a subsurface space. In FIG. 2, a diffusion process 200 is configured with an interpretation principle 206, such as salt properties of a subsurface formation. During the diffusion process 200, one or more diffusion models 210 may be derived for indicating one or more geological properties related to salt. The diffusion models 210 may be trained based on labeled seismic image samples 208 related to salt. Each diffusion model 210 may be trained at a different time with different data samples. Additionally, each of the training models 210 may be configured with different information and data related to salt.

During training, the seismic image samples 208 may be labeled to indicate aspects of interest related to salt in the subsurface formation. In some implementations, training the diffusion process includes forward diffusion 202 which may take input from two channels—channel 1 and channel 2. Channel 1 may include the seismic image sample 208, whereas channel 2 may include a segmented image sample 207 indicating salt content of a subsurface space. In the segmented image sample 207, white color indicates salt and black color indicates absence of salt. Forward diffusion 202 may add noise to image samples and then estimate how much noise was added to each image sample. For example, forward diffusion 202 may add noise to the segmented image sample 207 to form the noisy image 203. In some implementations, forward diffusion 202 may iteratively add noise to the segmented image sample 207, where iterations proceed from t=0 to t=T. However, in some implementations, the diffusion process 202 may add all the noise at once without iterating (e.g., see discussion of FIG. 4). The noisy image 203 may be included in channel 2. Forward diffusion 202 may update the diffusion process 200 based on differences between estimated noise and actual noise added to the segmented image sample 207 (also referred to herein as loss).

The diffusion process 200 also may include operations for backward diffusion 204. Backward diffusion 204 may receive an input seismic image 212 (channel 1). Backward diffusion 204 also may generate a noisy image 211 (channel 2). The noisy image 211 may be generated according to the noise-adding process used in forward diffusion 202. Using the input seismic image 212 and the noisy image 211, backward diffusion 204 may remove noise from the noisy image 211 to generate an ensemble of plausible interpretations 216 for the input seismic image 212. The ensemble of plausible interpretations 216 may include a plurality of sample interpretations 218-230. In some implementations, each sample interpretation is represented as a segmented image indicating salt concentration (or other salt-related geological properties of interest) inferred from the input seismic image 212. One or more of the sample interpretations 218-230 may be utilized by operators or other computerized components to make decisions about, modify, or implement subsurface operations. Therefore, after training, the diffusion process 200 may indicate a probability distribution of one or more reservoir parameters, such as salt concentration, in a subsurface space relative to a borehole.

Figure 3:
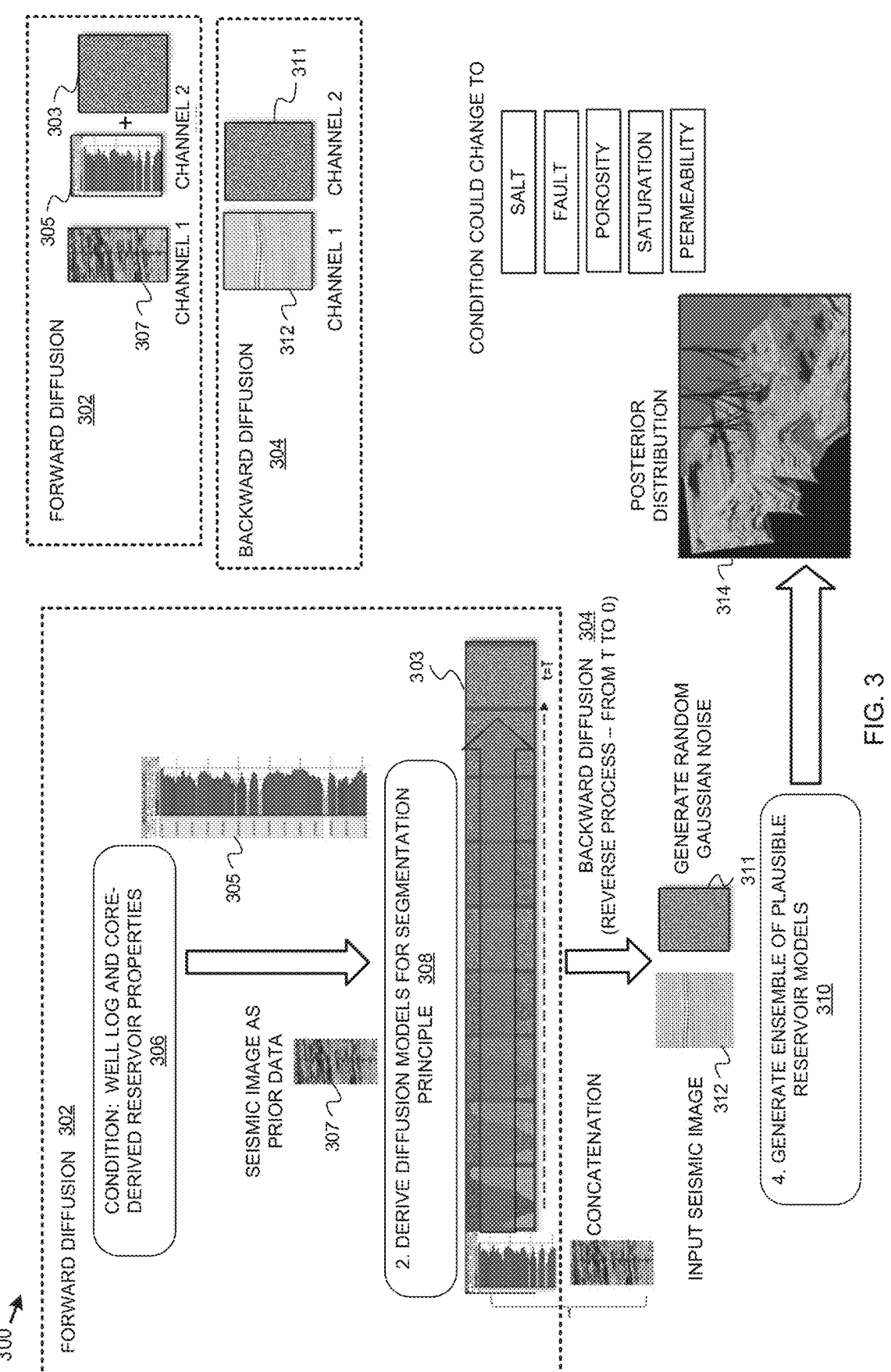
FIG. 3 is a block diagram showing example data flow and operations for an example application of the diffusion process for reservoir model inversion.

FIG. 3 is a block diagram showing example data flow and operations for an example application of the diffusion process for reservoir model inversion. In FIG. 3, a diffusion process 300 may include forward diffusion 302 and backward denoising 304. The forward diffusion 302 may include a condition 306, such as a well log and core-derived reservoir properties 305. The forward diffusion 302 may receive labeled seismic image samples 307 (channel 1) and the well log and core-derived reservoir properties 305 (channel 2) to derive one or more diffusion models for an image segmentation principle 308. Image segmentation principles may differ for different reservoir parameters. For example, the first image segmentation principle may relate to reservoir properties, a second image segmentation principle may relate to salt, and so on. The forward diffusion 302 may add noise (such as Gaussian noise) to each seismic image sample 307 to create a noisy image 303 (channel 2). The forward diffusion 302 may update the diffusion process 300 based on loss related to the noisy image 303 (see also discussion of loss as described with reference to FIGS. 1 and 2).

The diffusion process 300 also may include operations for backward diffusion 304. After the diffusion process has derive diffusion models for segmentation principle (such as via training), it may be ready to generate reservoir models. Operations for backward diffusion 304 may include receiving an input seismic image 312 (channel 1) and a noisy image 311 (channel 2). Backward diffusion 304 may iteratively remove noise from the noisy image 312 to produce an ensemble of plausible reservoir models, such as a reservoir model 314. The reservoir model 314 may be segmented according to the image segmentation principle utilized in the training process (e.g., see discussion of 308).

Figure 4:
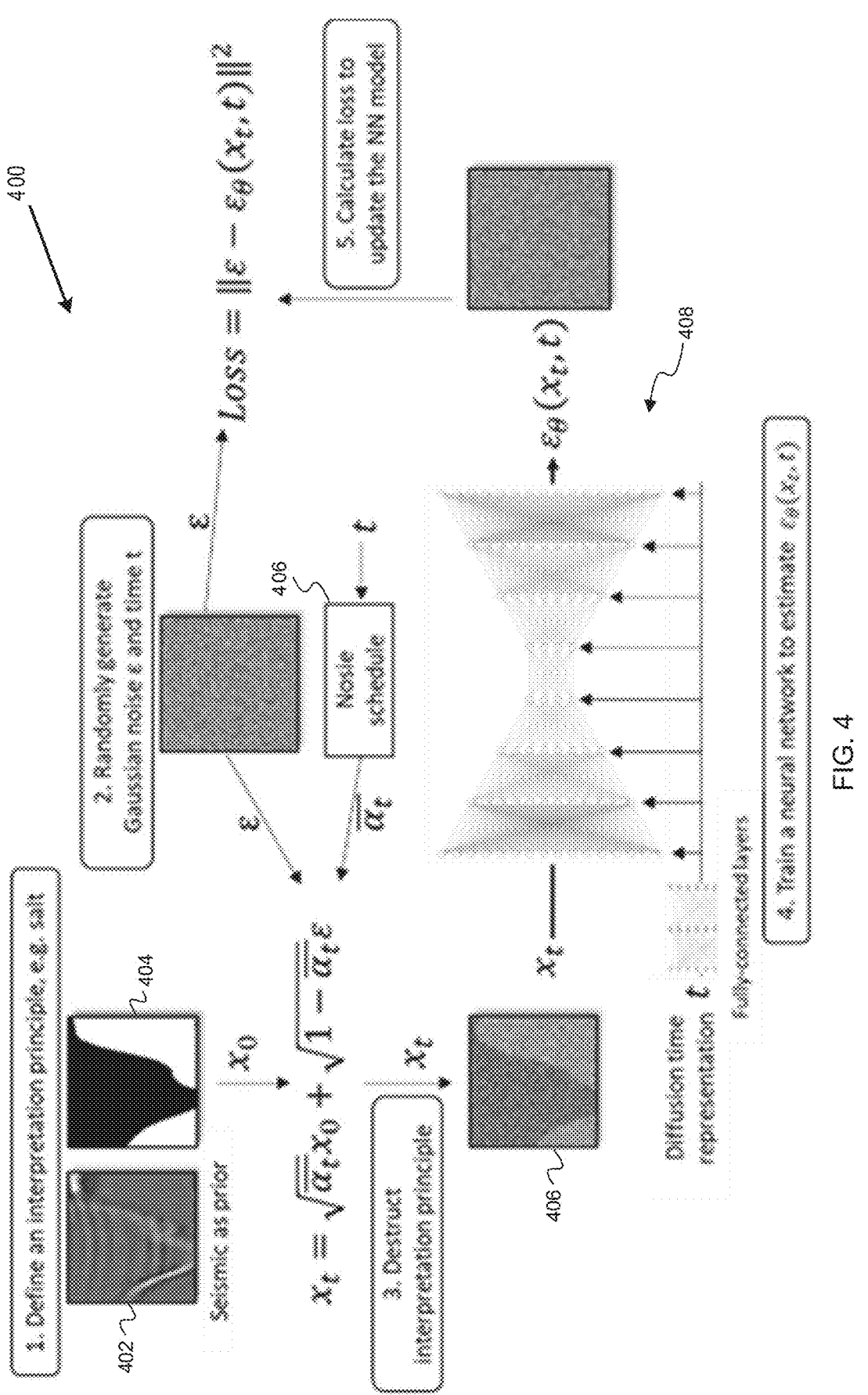
FIG. 4 is a block diagram showing example data flow and operations for training a diffusion process.

FIG. 4 is a block diagram showing example data flow and operations for training a diffusion process. In FIG. 4, data flow and operations for an example diffusion process 400 occur in four stages. The four stages may be included in operations for forward diffusion. During stage 1, the diffusion process 400 may be configured with an interpretation principle, such as salt, faults, porosity, etc. The interpretation principle may define data formats for input samples and methodologies by which the diffusion process may process the input samples. For example, a salt interpretation principle may define a data format for seismic image samples relating to salt, an image segmentation format for segmented image samples relating to salt, and other aspects of the diffusion process. During stage 1, the diffusion process also may receive data samples, such as a salt-related seismic image sample 402 and a salt-related segmented image sample 404. The salt-related segmented image sample 404 may be labeled to indicate salt-related aspects of interest.

During stages 2, the diffusion process 400 may generate random Gaussian noise ε according to a noise schedule $\overline{\alpha_t}$ (406), where t represents time.

During stage 3, the diffusion process 400 may add random noise ε to the salt-related segmented image sample 404 to form a noisy image 406. By adding random noise, the diffusion process "destroys" the interpretation principle, such as by distorting the salt-related segmented image sample 404 with noise. If done iteratively, the diffusion process 400 may add noise in T iterations—iterating from $x_0$ to $x_T$. However, using Equation 1, the diffusion process 400 may add the random noise in one iteration moving directly from $x_0$ to $x_T$.

$$x_t = \sqrt{\overline{\alpha_t}} x_0 + \sqrt{1 - \overline{\alpha_t}} \varepsilon \qquad (1)$$

In Equation 1, $x_t$ may be the resulting noisy image (such as the noisy image 406) and $x_0$ may be the initial image sample (such as the salt-related segmented image sample 404). In Equation 1, $\overline{\alpha_t}$ may be a pre-defined noise schedule based on time t. Additionally, ε may be an amount of randomly generated Gaussian noise. The randomly generated Gaussian noise may have a normal probability distribution.

During stage 4, the diffusion process 400 may provide $x_t$ (e.g., the noisy image 406) to a neural network 408 (such as a U-Net) to estimate the amount of noise that was added during at stage 3. The estimated noise added at time=t may be referred to as $\varepsilon_\theta(x_t, t)$.

During stage 5, the diffusion process 400 may estimate loss based the difference between the Gaussian noise & and the diffused principle $\varepsilon_\theta(x_t, t)$ at time t. The loss function may be represented by Equation 2 for a random time step t given $\varepsilon \sim \mathbb{N}(0,1)$.

$$\text{Loss} = \|\varepsilon - \varepsilon_\theta(x_t, t)\|^2 \qquad (2)$$

Equation 3 shows additional relationships between $\varepsilon_{\theta\theta}(x_t, t)$ and ε as they relate to iteratively computing loss.

$$\text{Loss} = \|\varepsilon - \varepsilon_\theta(x_t, t)\|^2 = \left\|\varepsilon - \varepsilon_\theta\left(\sqrt{\overline{\alpha_t}} x_{t-1} + \sqrt{(1 - \overline{\alpha_t})} \varepsilon, t\right)\right\|^2 \qquad (3)$$

During stage 5, the diffusion process 400 also may update the neural network 408 based on the loss, such as by performing gradient descent based on the loss.

Figure 5:
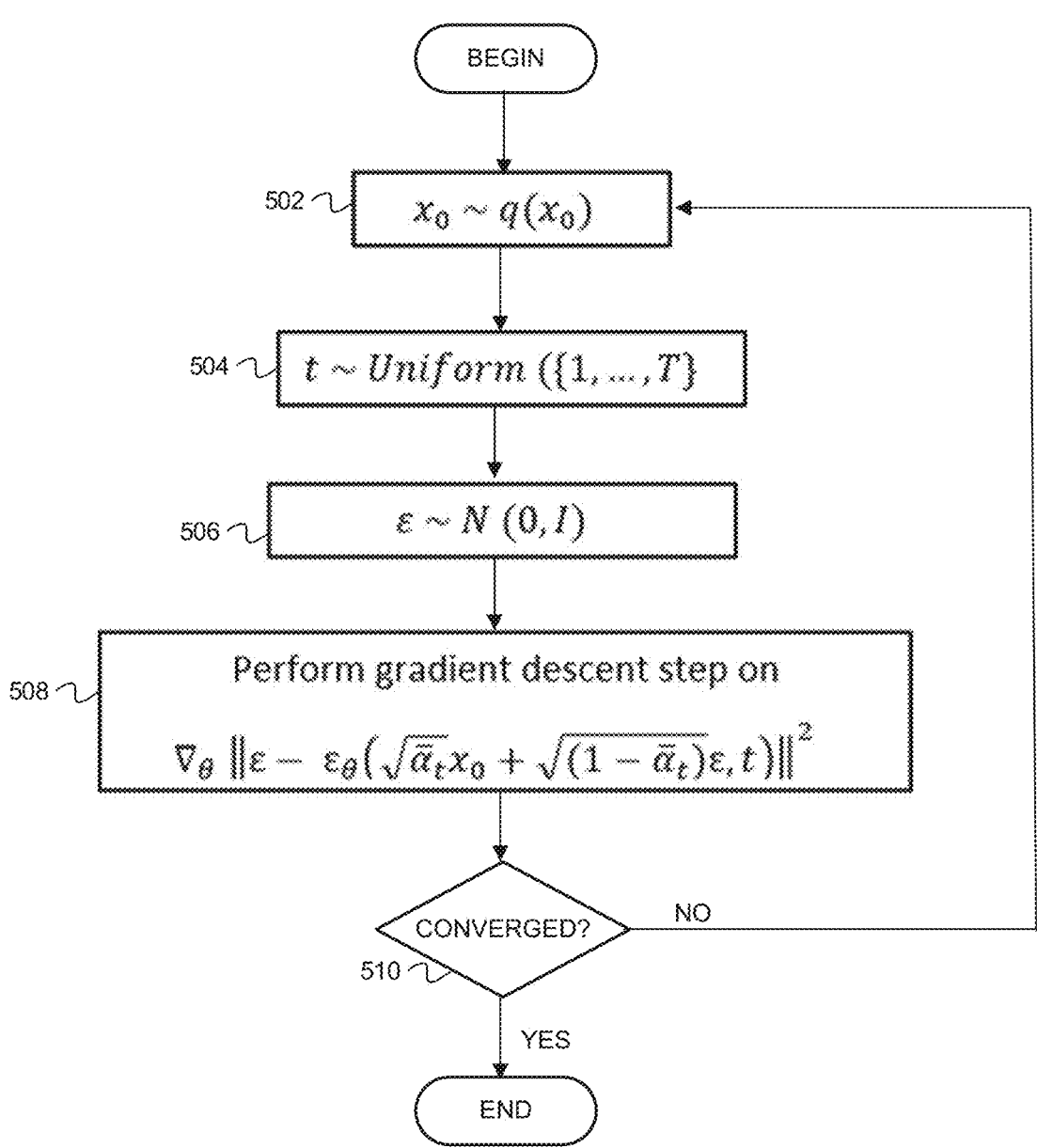
FIG. 5 is a flow diagram illustrating example operations for training the diffusion process.

The diffusion process 400 may repeat the training operations described with reference to stages 1-5 for any suitable number of image samples and for any suitable interpretation principle(s). FIG. 5 further describes an example training process. FIG. 5 is a flow diagram illustrating example operations for training a diffusion process. At block 502, an image sample $x_0$ is sampled from a data set q. At block 504, t is sampled from a uniform distribution. At block 506, noise is sampled from a normal distribution. At block 508, the learning objective θ is optimized using gradient descent. If the optimization converges, operations end. Otherwise, operations loop back to 502.

Figure 6:
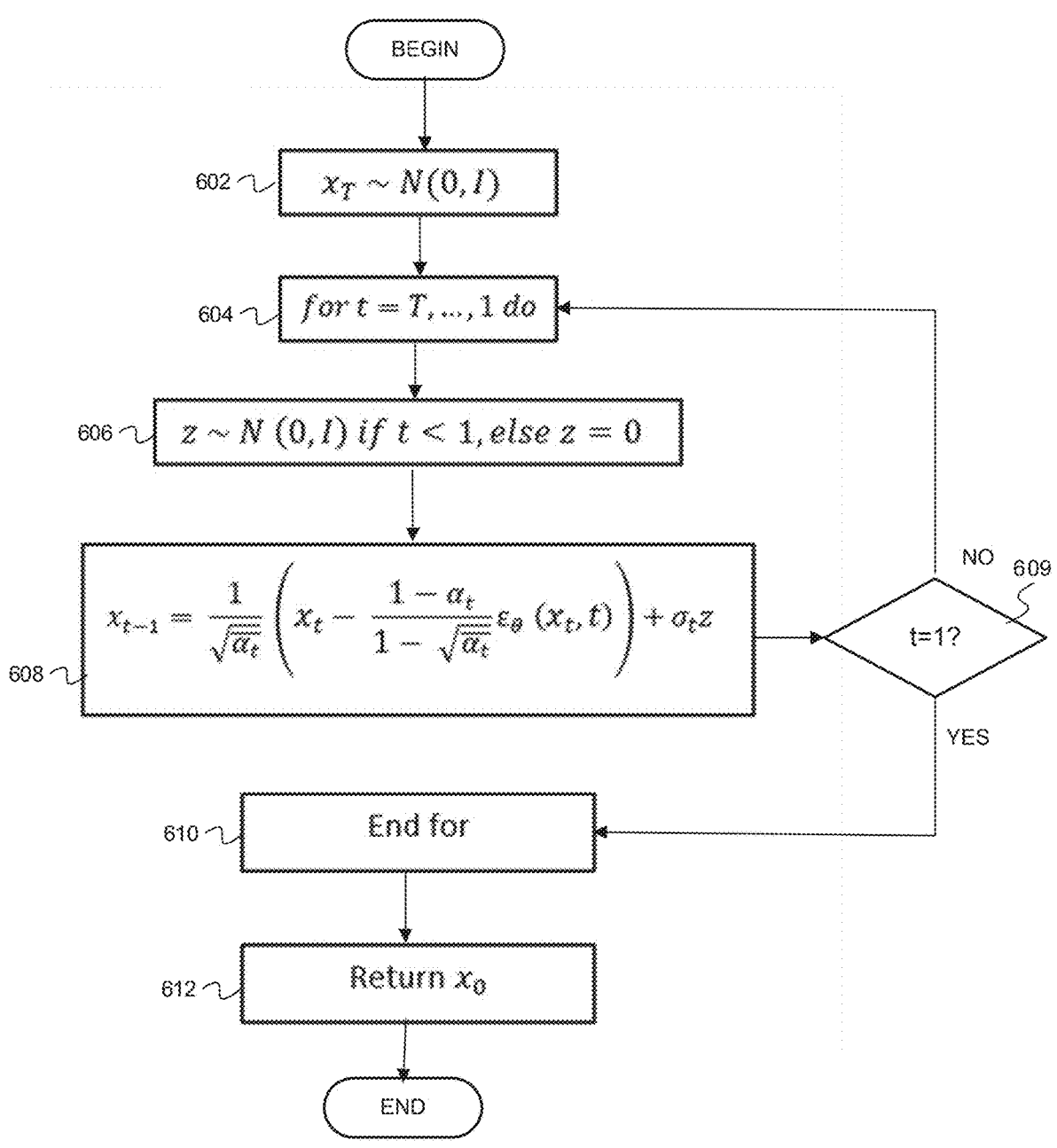
FIG. 6 is a flow diagram illustrating example operations of the diffusion process may perform backward diffusion (also referred to herein as backward denoising).

After training the neural network to estimate noise, the diffusion process may be used to make inferences about input images. For example, after training, the diffusion process may receive input image and other inputs (such as seismic information and data) and provide a segmented image indicating salt concentration. When making inferences, the diffusion process 400 may perform reverse diffusion (also referred herein as reverse denoising) to generate images that indicate geological properties of interest. FIG. 6 is a flow diagram illustrating example operations for backward diffusion. At block 602, backward diffusion begins with a noisy image, $x_T$, which is sampled from a normal distribution N(0,I). $x_T$ may be an input seismic image that includes Gaussian noise. At block 604, a loop initiates, where T will count down to one. At block 606, Gaussian noise, z, is sampled from a normal distribution if t>1. If t<=1, the Gaussian noise is zero, so no noise, z, will be added in the next operation (i.e., no noise added at 608 if t<=1). At block 608, the next image $x_{t-1}$ is generated based on the formula shown in block 608. At block 609, if t=1, the loop ends, and flow continues at block 612. Otherwise, flow continues to block 604. At block 612, backward diffusion returns an output image, $x_0$, such as the output image 126 of FIG. 1.

Figure 7:
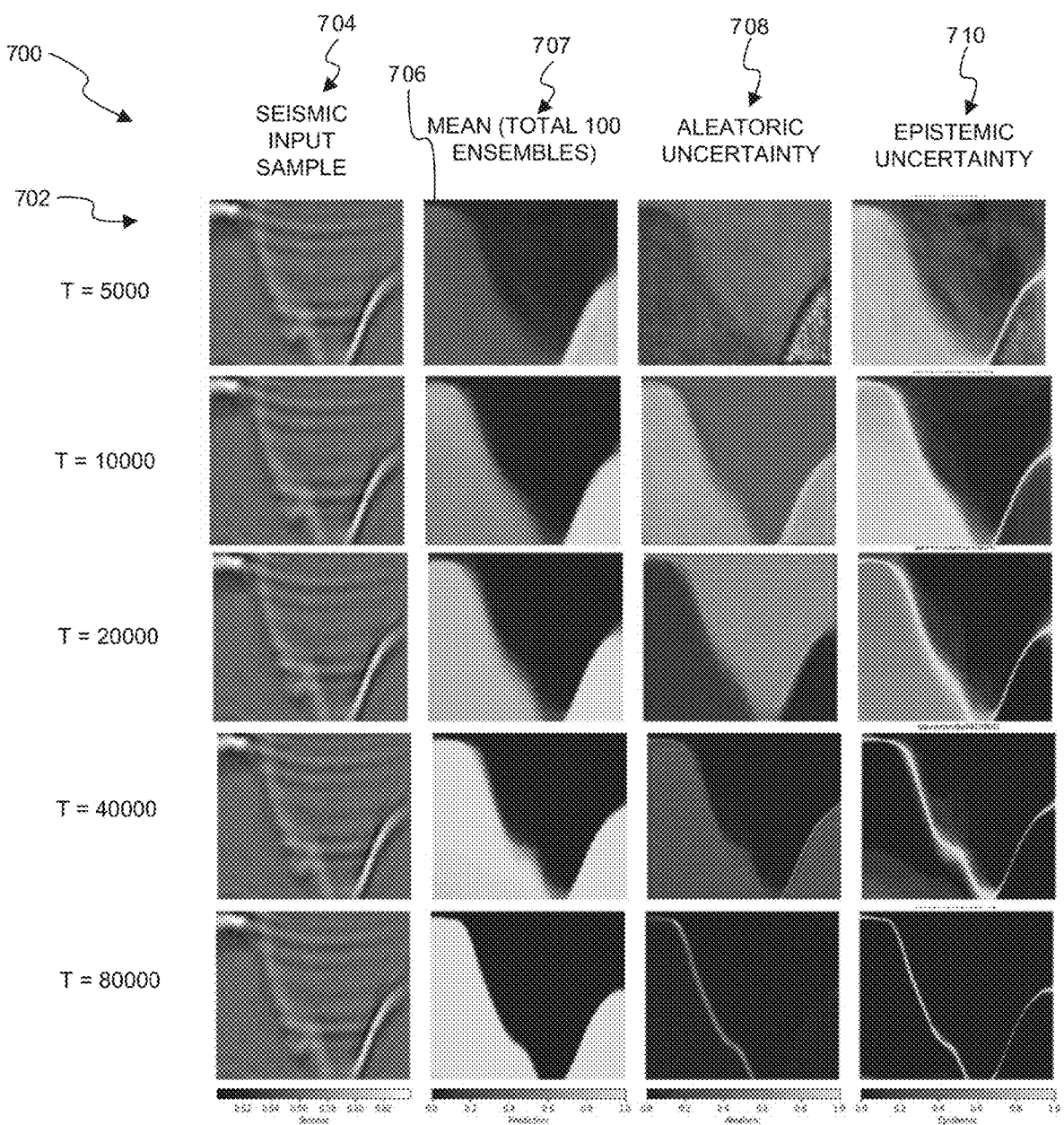
FIG. 7 is an image grid showing example seismic input samples and output images from a diffusion process at varying values of T.

FIG. 7 is an example image grid showing seismic input samples and output images from a diffusion process at varying values of T. In the image matrix 700, images in a first row 702 were processed using T=5000 for the forward diffusion process (i.e., the diffusion process has 5000 iterations). For all rows, T=1000 for the reverse diffusion process. The second image in the first row is a mean image 706. The mean image 706 was generated by repeating the backward diffusion process on 100 different diffusion models, where each of the 100 models was trained separately. All 100 results were averaged to form the mean image 702. Relative to other mean images in a second column 707 of the image matrix 700, the mean image 706 has gradual transitions between colors (blue, purple, and yellow) which indicates more uncertainty. As T increases, the mean images have sharper transitions between colors which indicates less uncertainty. In the image matrix 700, a third column 708 includes images showing aleatoric uncertainty 708. As T increases, aleatoric uncertainty decreases. In the image matrix 700, a fourth column 708 includes images showing epistemic uncertainty. As T increases, epistemic uncertainty decreases.

Figure 8:
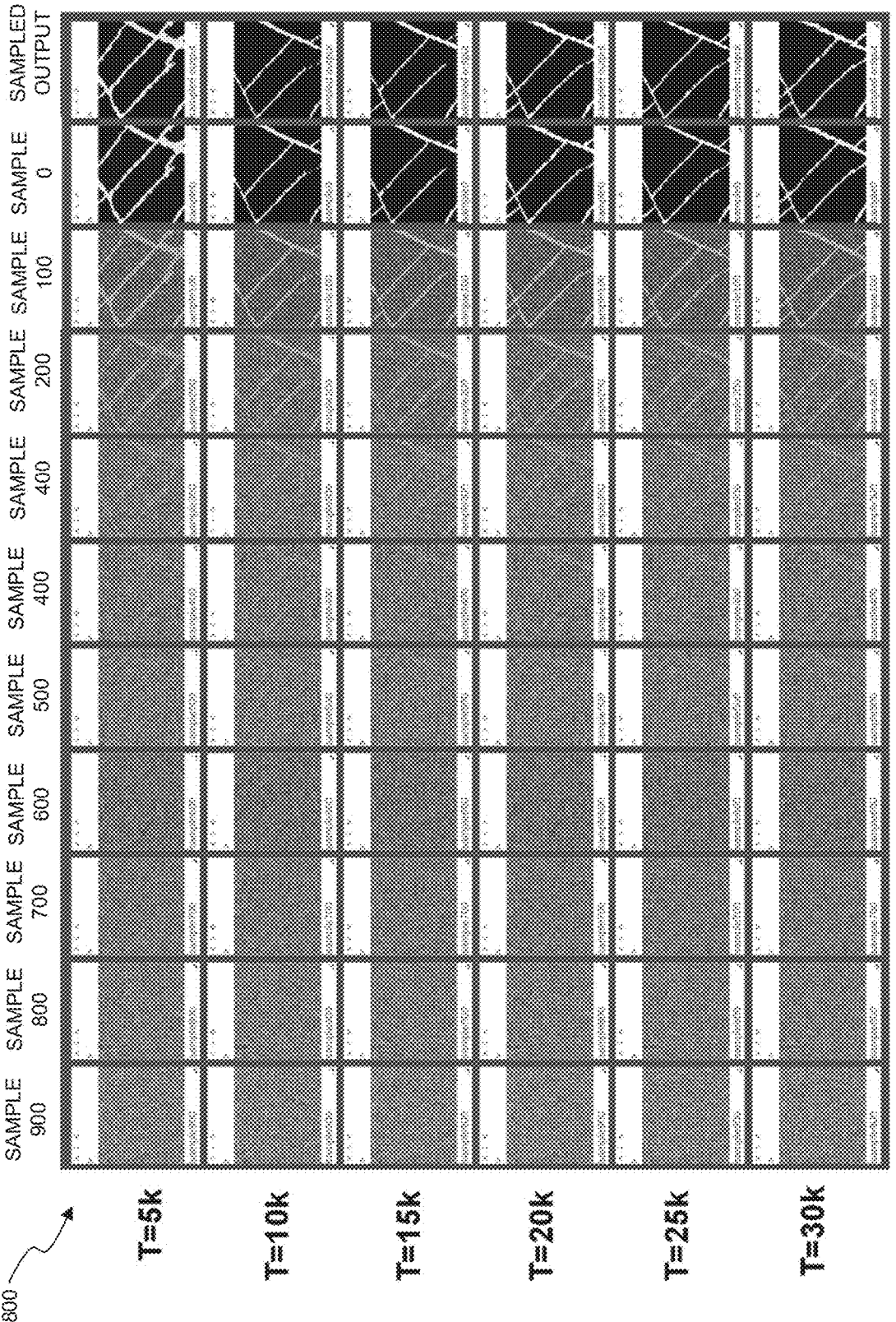
FIG. 8 is an image grid showing example results at varying values of T for a reverse diffusion process that identifies faults.

FIG. 8 is an image grid showing results at varying values of T for a reverse diffusion process that identifies faults. In image matrix 800, each row has a different T value for an associated forward diffusion process. For example, images of the first row were generated by a diffusion model that had 5000 iterations for its forward diffusion process. The reverse diffusion process for all rows was performed with 1000 iterations (i.e., t=1000). Each column shows a numbered output image in the reverse diffusion process. The images in the right-most column are the output images of the reverse diffusion process.

Figure 9:
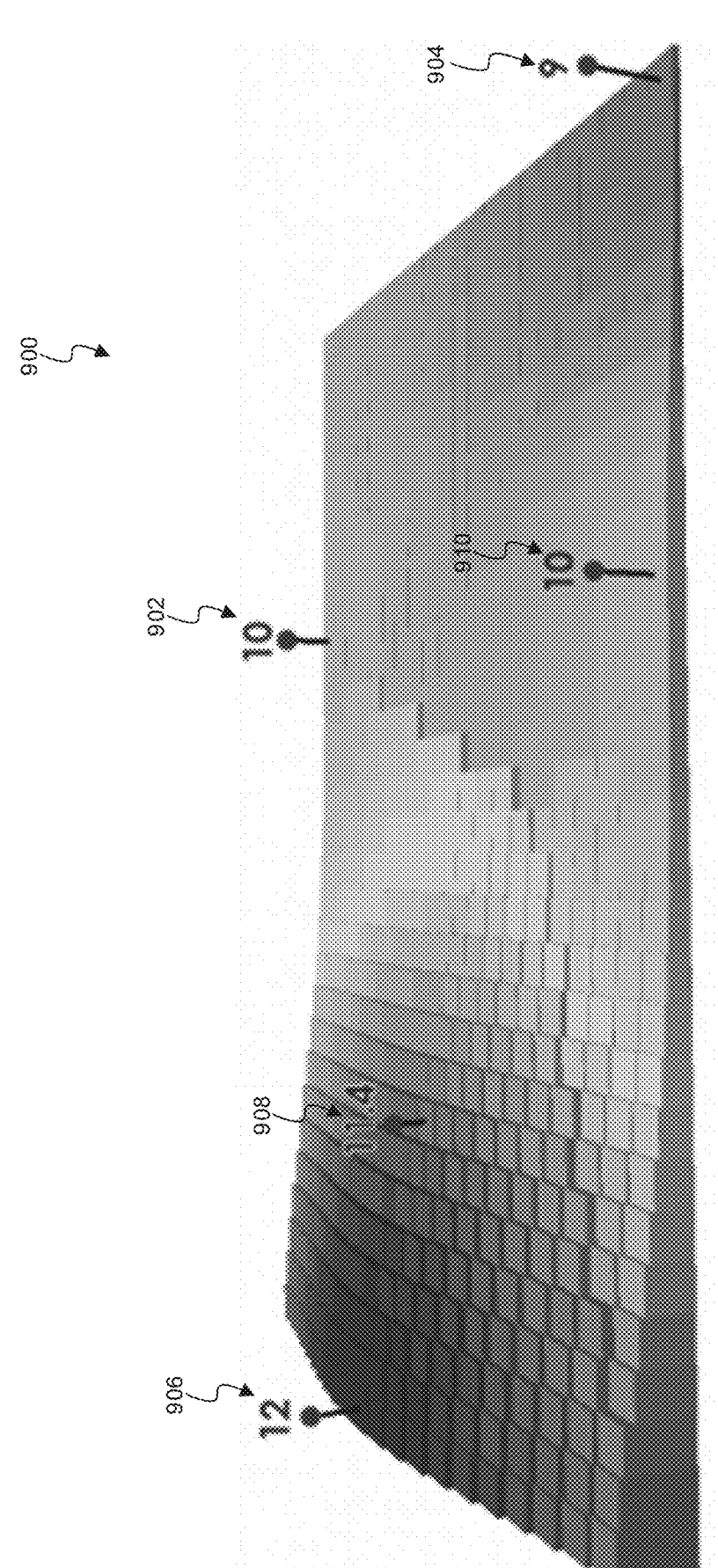
FIG. 9 is an example three-dimensional reservoir model created using a diffusion process.

FIG. 9 is an example three-dimensional reservoir model created using a diffusion process. In the reservoir model 900, there are five wells 902-910. At each well, there is information about reservoir parameters of interest, such as salt, porosity, faults, etc. However, there are spaces for which there is little or no information about reservoir parameters. Some implementations may perform reservoir inpainting using the diffusion process. Given the data from the wells 902-910, the diffusion process may interpolate the missing data to generate a complete reservoir model. For example, a forward diffusion process may be trained using data from the wells 902-910. After training, the backward diffusion process may generate missing parts of the reservoir model to form a complete reservoir model.

Figure 10:
FIG. 10 is a schematic diagram of an onshore borehole seismic survey environment.
Figure 10:
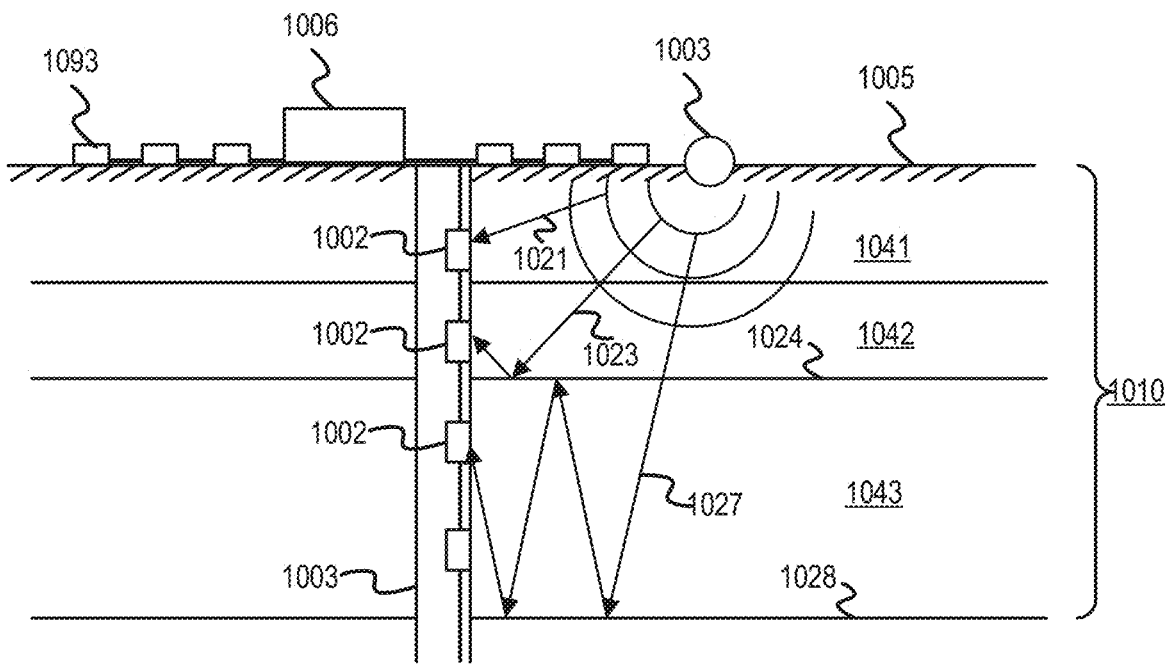

As described herein, some implementations of the diffusion process utilize seismic data. The following discussion of FIGS. 10 and 11 describe how some implementations may collect seismic data. FIG. 10 is a schematic diagram showing an onshore borehole seismic survey environment. Subsurface seismic sensors 1002 are in a spaced-apart arrangement within a borehole 1003 to detect seismic waves. The subsurface seismic sensors 1002 can be fixed in place by anchors to facilitate sensing seismic waves. In other embodiments, the subsurface seismic sensors 1002 can be attached to or integrated into a tubing (e.g., well casing or drill pipe), part of a logging-while-drilling (LWD) tool string, part of a bottomhole assembly, incorporated into a wireline logging tool, or attached to a wireline logging tool string. Furthermore, the subsurface seismic sensors 1002 communicate wirelessly or via cable to a data acquisition system 1006 at a surface 1005, where the data acquisition system 1006 receives, processes, and stores seismic measurements collected by the subsurface seismic sensors 1002. In addition, the data acquisition system 1006 can collect seismic measurements from the surface seismic sensors 1093, which are positioned on the surface 1005.

The seismic source 1008 generates a seismic wave which is then measured and added to a set of seismic measurements. The seismic wave propagates through a formation 1010. The formation 1010 includes an upper layer 1041, middle layer 1042, and lower layer 1043. A first seismic wave propagates along the wave trajectory 1021 as a direct wave, which proceeds directly through the upper layer 1041 to the subsurface seismic sensors 1002 without reflection. A second seismic wave propagates along the wave trajectory 1023, which shows a reflection at the interlayer boundary 1024 before arriving at the subsurface seismic sensors 1002. A third seismic wave is a seismic multiple that propagates along the wave trajectory 1027, which travels through the upper layer 1041, middle layer 1042, and lower layer 1043 before being reflected twice off the interlayer boundary 1028 and once off the interlayer boundary 1024 before arriving at the subsurface seismic sensors 1002. Such waves reflect from acoustic impedance discontinuities to reach the subsurface seismic sensors 1002 and are seismic multiples due to the plurality of reflections off of interlayer boundaries. Illustrative discontinuities include faults, boundaries between formation beds, and boundaries between formation fluids. The collected seismic measurements can be used for seismic characterization, and seismic measurements corresponding to the third seismic wave propagating along the wave trajectory 1027 and other seismic multiples can be attenuated.

Figure 11:
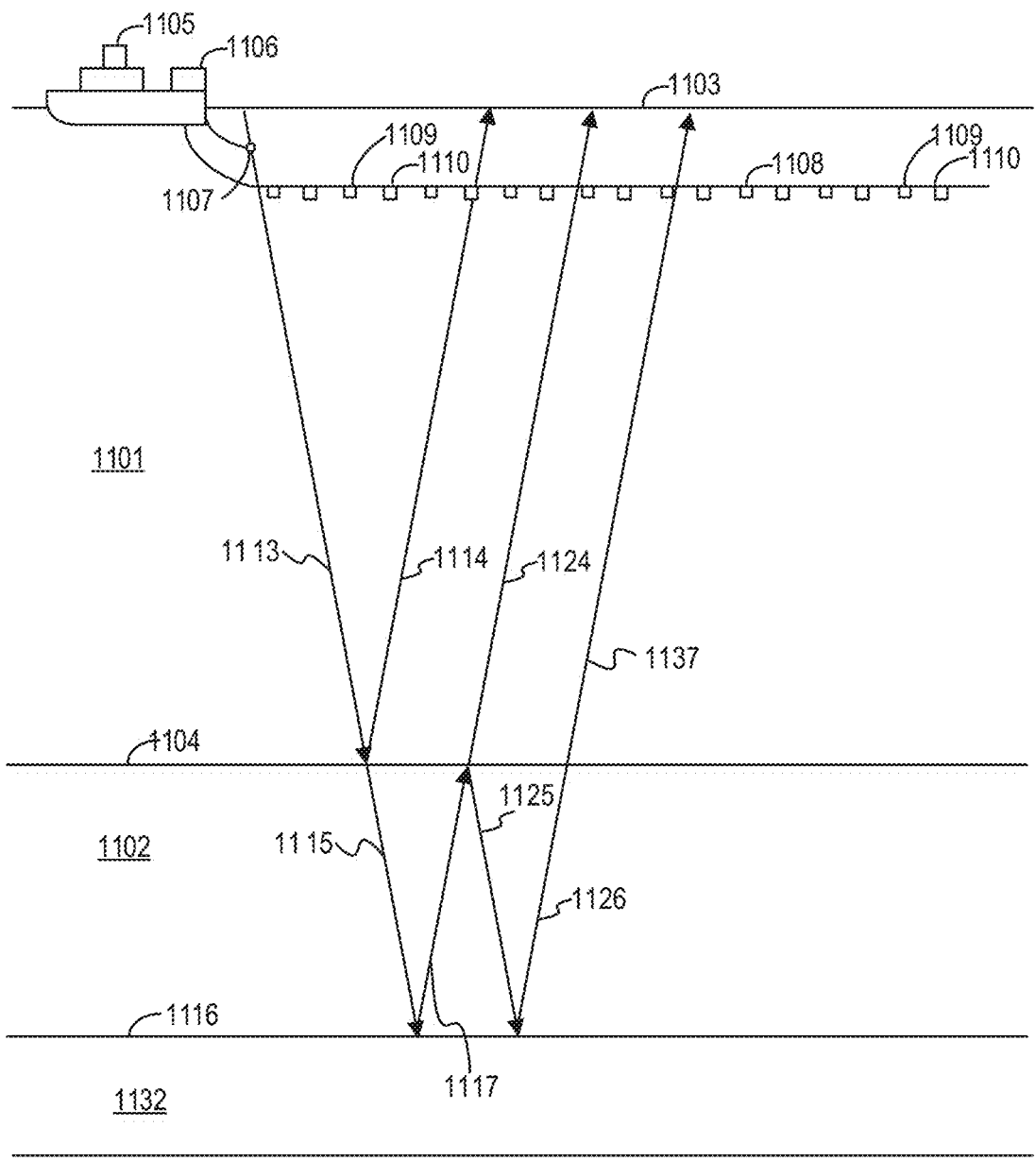
FIG. 11 is a schematic diagram of an elevation view of a typical marine seismic survey that can be used to provide seismic measurements.

FIG. 11 is a schematic diagram showing an elevation view of a typical marine seismic survey that can be used to provide seismic measurements. A body of water 1101 over the first geological layer 1102 is bounded at a water surface 1103 by a water-air interface and at a water bottom 1104 by a water-earth interface. Beneath the water bottom 1104 is a first geological layer 1102. Beneath the first geological layer 1102 is a second geological layer 1132, which is a subterranean layer of interest. A seismic vessel 1105 travels on the water surface 1103 and contains seismic acquisition control equipment 1106. The seismic acquisition control equipment 1106 includes navigation control, seismic source control, seismic sensor control, and recording equipment.

The seismic acquisition control equipment 1106 includes a seismic source 1107 to actuate at selected times. In response, the seismic source 1107 emits seismic waves. Seismic streamers 1108 contain seismic sensors to detect the reflected waves initiated by the seismic source 1107 and reflected from interfaces in the environment. The seismic streamers 1108 can contain seismic sensors such as hydrophones 1109 and/or water particle motion sensors such as geophones 1110. The hydrophones 1109 and geophones 11110 are typically co-located in pairs or pairs of sensor arrays at regular intervals along the seismic streamers 1108.

The seismic source 1107 is activated at periodic intervals to emit seismic waves in the vicinity of the seismic streamers 1108 with the hydrophones 1109 and the geophones 1110. Each time the seismic source 1107 is actuated, an acoustic/seismic wave travels upwardly or downwardly in spherically expanding wave fronts. The traveling waves will be illustrated by ray paths normal to the expanding wave fronts. The downwardly traveling wave from the seismic source 1107 traveling along a ray path 1113 will reflect off the earth-water interface at the water bottom 1104 and then travel upwardly along ray path 1114, where the wave can be detected by the hydrophones 1109 and geophones 1110. Such a reflection at the water bottom 1104, as in ray path 1114, contains information about the water bottom 1104 and hence can be retained for further processing. Additionally, the downwardly traveling wave traveling along ray path 1113 can transmit through the water bottom 1104 and travel along ray path 1115 before reflecting off a layer boundary 1116. This wave can then travel upwardly along ray path 1117, transmit through the water bottom 1104, and travels upwardly along ray path 1124 until it is detected by the hydrophones 1109 and geophones 1110. Such a reflection off the layer boundary 1116 can contain useful information about subterranean formations of interest that can be used to generate seismic measurements. The measurements made of the waves traveling along ray path 1114 and ray path 1124 are measurements of primary reflection waves.

In addition, a portion of the wave traveling upwardly along ray path 1117 can be reflected by the water bottom 1104 and travel downwardly along the ray path 1125. The wave traveling downwardly along ray path 11125 can then be reflected by the layer 1 boundary 1116 again, travel upwardly along the ray path 126 until it transmits through the water bottom 1104, and travel upwardly along the ray path 1137 until it is detected by the hydrophones 109 and geophones 1110. The measurements made of the waves traveling along ray path 1137 are measurements of seismic multiples, which have reflected off of the layer boundary 1116 and the water bottom 1104. The measurements of these seismic multiples can be attenuated by a seismic multiples mitigation system.

After collecting seismic data (such as by the methods described herein), some implementations process and analyze the seismic data. Various seismic data analysis methods include seismic image creation and processing. Creating images based on seismic data may involve seismic data processing, interpretation, and visualization. Some implementations may use digital signal processing techniques, such as filtering, deconvolution, and stacking to process raw seismic data. The processing may correct for noise, correct for the effect of the wavelet used for the source, and enhance the signal-to-noise ratio. After data processing, some implementations may perform velocity analysis to estimate the velocity of the different rock layers. This may be necessary to accurately generate an image of the subsurface structure. The processed seismic data may then be used to create an image of the subsurface structure. Images may be created using time-domain imaging or depth-domain imaging. After an image has been created, the image may be used to identify rock layers and geological structures, such as by analyzing amplitude, phase, and geometry of the reflections in the image. The interpreted seismic data may be visualized using various software tools to create 3D images and models of the subsurface structure. These images and models may be used to guide exploration and production activities, as well as for other geotechnical and engineering purposes. Any of the seismic data and images described herein may be used to configure the diffusion process or may be used as input into the diffusion process.

Figure 12:
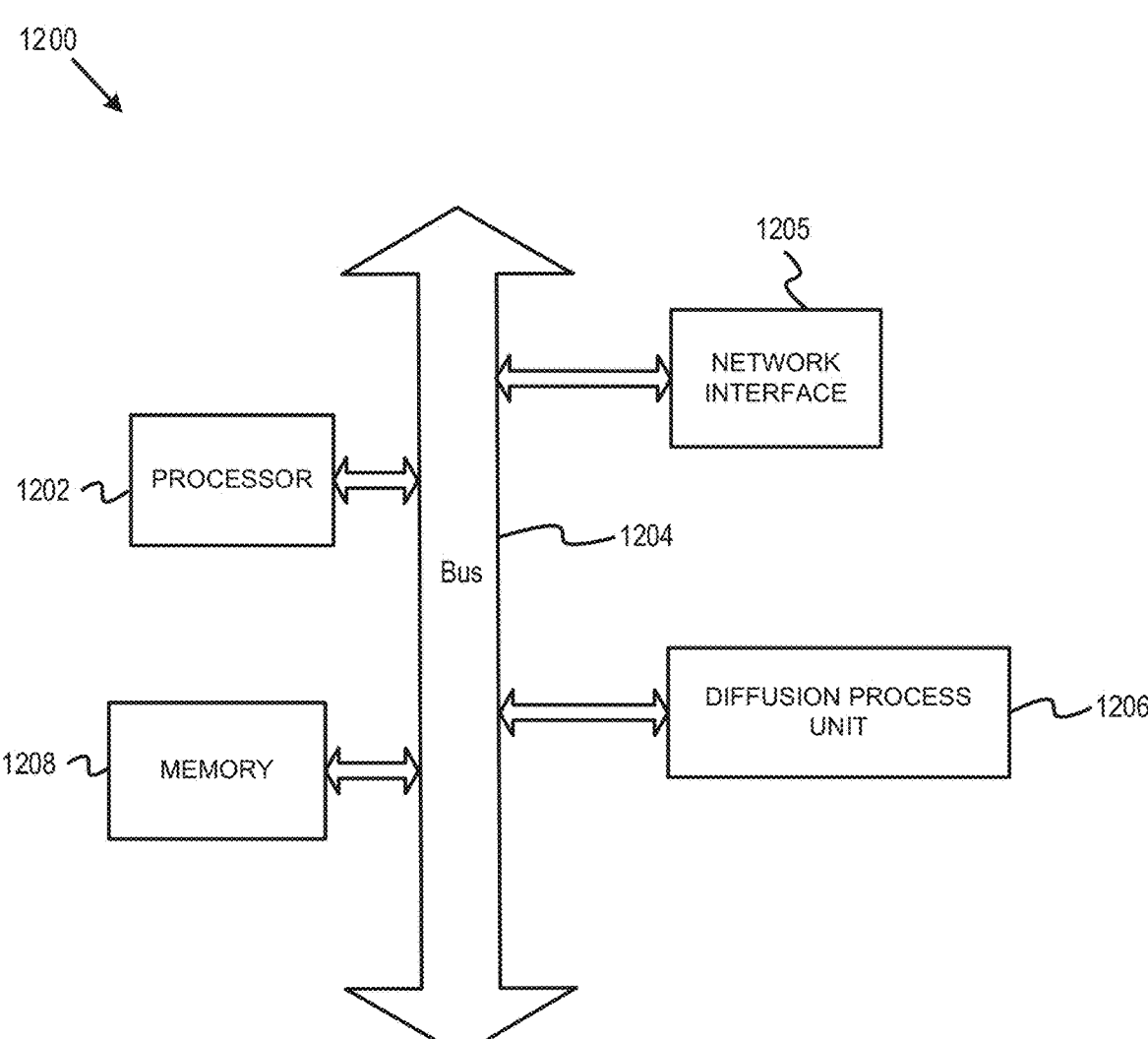
FIG. 12 is a block diagram illustrating a computer system, according to some aspects.

FIG. 12 is a block diagram illustrating a computer system, according to some aspects. In FIG. 12, a computer system 1200 may include one or more processors 1202 connected to a system bus 1204. The system bus 1204 may be connected to memory 1208 and a network interface 1205. The memory 1208 may include any suitable memory random access memory (RAM), non-volatile memory (e.g., magnetic memory device), and/or any device for storing information and instructions executable by the processor(s) 1202. The network interface 105 may provide connectivity to any suitable network, such as a wired network, wireless network, satellite network, etc.

The computer system 1200 may include additional peripheral devices. For example, the computer system 1200 may include multiple external multiple processors. In some implementations, any of the components can be integrated or subdivided.

The computer system 1200 also may include a diffusion process unit 1206. diffusion process unit 1206 may implement the methods and operations described herein. In some implementations, the diffusion process unit 1206 may include components that implement techniques of machine learning described herein. For example, the diffusion process unit 1206 may include program instructions that implement one or more neural networks and train the one or more neural networks using one or more of the training methods described herein. In some implementations, the computer system 1200 may be referred to as a learning machine that implements the methods, operations, and components described herein. However, in some implementations, the learning machine may reside on a computer system like the computer system 1200. The learning machine may include the diffusion process unit 1206.

Any component of the computer system 1200 can be implemented as hardware, firmware, and/or machine-readable media including computer-executable instructions for performing the operations described herein. For example, some implementations include one or more non-transitory machine-readable media including computer-executable instructions including program code configured to perform functionality described herein. Machine-readable media includes any mechanism that provides (e.g., stores and/or transmits) information in a form readable by a machine (e.g., a computer system). For example, tangible machine-readable media includes read only memory (ROM), random access memory (RAM), magnetic disk storage media, optical storage media, flash memory machines, etc. Machine-readable media also includes any media suitable for transmitting software over a network.

Figure 13:
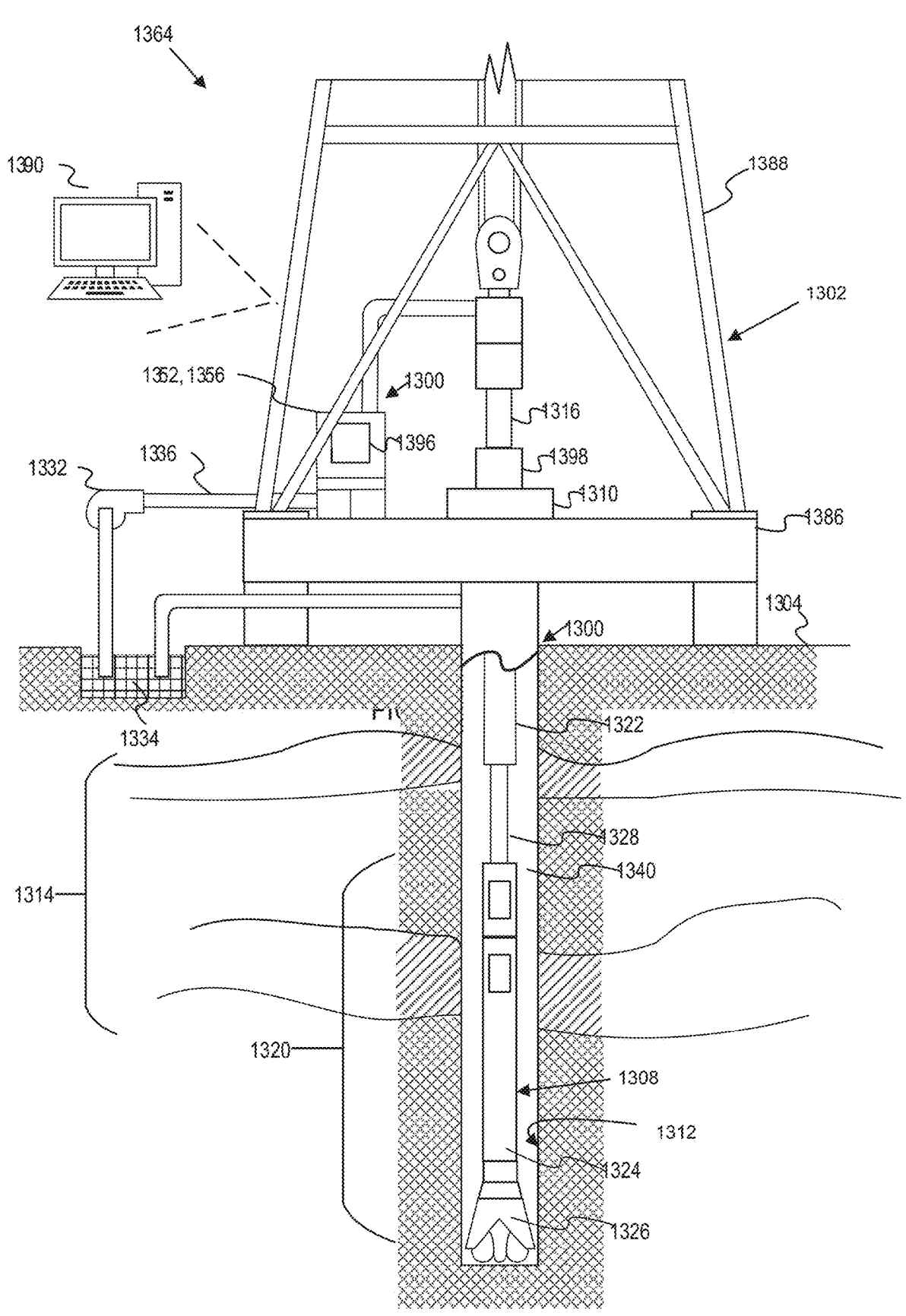
FIG. 13 is a schematic diagram showing a drilling rig system.

FIG. 13 is a schematic diagram showing a drilling rig system. For example, in FIG. 13, a system 1364 may form a portion of a drilling rig 1302 located at the surface 1304 of a well 1306. Drilling of oil and gas wells is commonly carried out using a string of drill pipes connected together so as to form a drilling string 1308 that may be lowered through a rotary table 1310 into a wellbore or borehole 1312. Here, a drilling platform 1386 may be equipped with a derrick 1388 that supports a hoist. A computer system 1390 (e.g., similar to the computer system 1200) may be communicatively coupled to any measurement devices attached to the system 1364 and may configured the system 1364 to utilize signal information without prior knowledge of antenna tilt-angles, as described herein.

The drilling rig 1302 may thus provide support for the drill string 1308. The drill string 1308 may operate to penetrate the rotary table 1310 for drilling the borehole 1312 through subsurface formations 1314. The drill string 1308 may include a Kelly 1316, drill pipe 1318, and a bottom hole assembly 1320, perhaps located at the lower portion of the drill pipe 1318.

The bottom hole assembly 1320 may include drill collars 1322, a down hole tool 1324, and a drill bit 1326. The drill bit 1326 may operate to create a borehole 1312 by penetrating the surface 1304 and subsurface formations 1314. The down hole tool 1324 may comprise any of a number of different types of tools including MWD tools, LWD tools, and others.

During drilling operations, the drill string 1308 (perhaps including the Kelly 1316, the drill pipe 1318, and the bottom hole assembly 1320) may be rotated by the rotary table 1310. In addition to, or alternatively, the bottom hole assembly 1320 may also be rotated by a motor (e.g., a mud motor) that may be located down hole. The drill collars 1322 may be used to add weight to the drill bit 1326. The drill collars 1322 may also operate to stiffen the bottom hole assembly 1320, allowing the bottom hole assembly 1320 to transfer the added weight to the drill bit 1326, and in turn, to assist the drill bit 1326 in penetrating the surface 1304 and subsurface formations 1314.

During drilling operations, a mud pump 1332 may pump drilling fluid (sometimes known by those of ordinary skill in the art as "drilling mud") from a mud pit 1334 through a hose 1336 into the drill pipe 1318 and down to the drill bit 1326. The drilling fluid may flow out from the drill bit 1326 and be returned to the surface 1304 through an annular area 1340 between the drill pipe 1318 and the sides of the borehole 1312. The drilling fluid may then be returned to the mud pit 1334, where such fluid may be filtered. In some embodiments, the drilling fluid may be used to cool the drill bit 1326, as well as to provide lubrication for the drill bit 1326 during drilling operations. Additionally, the drilling fluid may be used to remove subsurface formation 1314 cuttings created by operating the drill bit 1326. It may be the images of these cuttings that many implementations operate to acquire and process.

In some implementations, output of the diffusion process may be used to perform one or more subsurface operations in one or more subsurface formations. For example, a downhole operation may be initiated, modified, or stopped based on the output images generated by the diffusion process. Examples of such downhole operations may include completion of the wellbore, updating drilling operations, perforating, fracking, logging operations, additional sampling of the subsurface formation, etc. For instance, the output images may indicate hydrocarbons located at a different location in the subsurface formation than what was originally predicted. Accordingly, subsurface operations may be adjusted to maximize recovery of these hydrocarbons.

Figure 14:
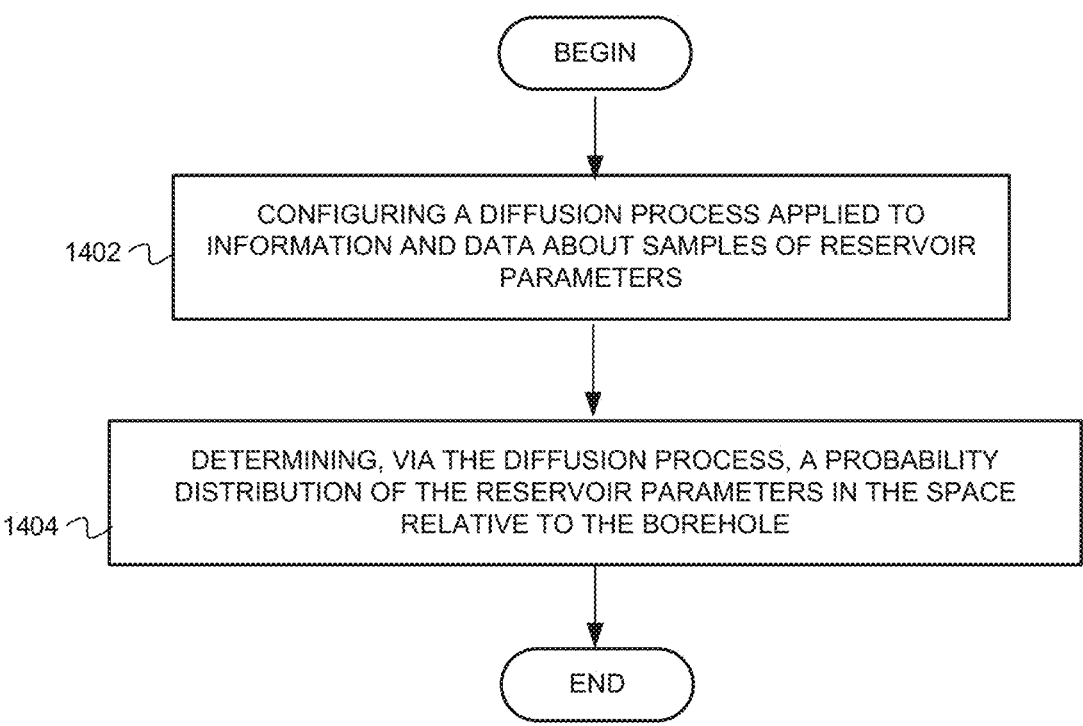
FIG. 14 is a flow diagram illustrating an example method for controlling a computer to geologically characterize a space relative to a borehole.

FIG. 14 is a flow diagram illustrating an example method for controlling a computer to geologically characterize a space relative to a borehole. At block 1402, a diffusion process unit 1206 may configure a diffusion process to be applied to information and data about samples of reservoir parameters. At block 1404, the diffusion process unit 1206 may determine, via the diffusion process, a probability distribution of the reservoir parameters in the space relative to the borehole.

The images described herein are electronic images produced by a machine in any suitable machine-processible image format, such as jpeg, GIF, PNG, etc. Therefore, the images described here are not mental images nor are they images created by a human with pencil and paper (or other human processes for drawing images). All computations described herein are performed by computing devices including hardware only, performed by hardware and software, or performed by machine-readable instructions executable on a computing device. For example, the neural networks described herein are implemented in hardware only, hardware and software, or as machine-readable instructions executable on a computing device. Hence, the neural networks described here cannot be alleged to be abstract or otherwise conceptual devices. All implementations of the diffusion processes described herein relate to operations implemented on computing devices, computer hardware, other machines, or machine-readable instructions executable via a computing device. Therefore, there are no implementations of the diffusion processes described herein that include any operations that may be performed in the human mind, done with pencil and paper, or otherwise performed without tangible machinery. Furthermore, the claims exclude all implementations that include operations performed in the human mind, operations performed with pencil and paper, and operations performed without tangible machinery.

While the aspects of the disclosure are described with reference to various implementations and exploitations, these aspects are illustrative and the scope of the claims is not limited to them. In general, operations, components, and methods described herein may be implemented with facilities consistent with any suitable computer system. Many variations, modifications, additions, and improvements are possible.

Plural instances may be provided for components, operations, or structures described herein as a single instance. Also, boundaries between various components, operations and data stores may differ, and particular operations are illustrated in the context of specific example configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

None of the implementations described herein may be performed in the human mind nor using pencil and paper unless explicitly noted otherwise herein. None of the implementations described herein may be performed without the computerized components described herein (however, later-developed computerized components may be used). Any of the images described herein may be in any format suitable for presentation on a computer display and/or processing by a computer system. Any reference to the images or other components being in a computer-readable or computer-presentable format exclude human-created versions such as images drawn or otherwise made by a human without a computer. Some implementations may perform additional operations, fewer operations, operations in parallel or in a different order, and some operations differently.

Example Clauses

The following clauses indicate various example implementations.

Clause 1: A method for controlling a computer to geologically characterize a space relative to a borehole, the method comprising: configuring a diffusion process applied to information and data about samples of reservoir parameters; and determining, via the diffusion process, a probability distribution of the reservoir parameters in the space relative to the borehole.

Clause 2: The method of clause 1 wherein the information and data include at least one or geophysical data, borehole data, or geological information.

Clause 3: The method of any one or more of clauses 1-2, wherein the reservoir parameters include at least one of porosity, salt, saturation, permeability, or fault.

Clause 4: The method of any one or more of clauses 1-3, wherein the reservoir parameters relate to at least one of a hydrocarbon reservoir or a salt reservoir.

Clause 5: The method of any one or more of clauses 1-4, wherein configuring the diffusion process includes: inputting, into a learning machine, sample images indicating the samples of the reservoir parameters, wherein the samples of the reservoir parameters have the probability distribution.

Clause 6: The method of any one or more of clauses 1-5 further comprising: generating a generated image depicting the reservoir parameters in the space relative to the borehole.

Clause 7: The method of any one or more of clauses 1-6, wherein the configuring the diffusion process includes: generating, by a neural network of the computer, a first noisy image by adding a first amount of noise to a sample seismic image, wherein the sample seismic image represents at least one of the reservoir parameters of the space relative to the borehole, and wherein the at least one of the reservoir parameters in the sample seismic image has the probability distribution; determining, by the neural network, a first estimated amount of noise in the first noisy image; determining, by the neural network, a difference between the first estimated amount of noise and the first amount of noise; and updating the neural network based on the difference.

Clause 8: The method of any one or more of clauses 1-6 further comprising: receiving a second seismic image in the neural network; and generating, based on the second seismic image and on the probability distribution of the reservoir parameters, an output image indicating one or more of the reservoir parameters in the space relative to the borehole.

Clause 9: One or more machine-readable mediums including instructions, which when executed by one or more processors, control a computer to geologically characterize a subsurface space, the instructions comprising: instructions to configuring a diffusion process applied to information and data about samples of reservoir parameters; and instructions to determine, via the diffusion process, a probability distribution of the reservoir parameters in the subsurface space.

Clause 10: The machine-readable medium of clause 9, wherein the information and data include at least one or more geophysical data, borehole data, or geological information.

Clause 11: The machine-readable medium of any one of clauses 9-10, wherein the reservoir parameters include at least one of porosity, salt, saturation, permeability, or fault.

Clause 12: The machine-readable medium of any one of clauses 9-11, wherein the reservoir parameters relate to at least one of a hydrocarbon reservoir or a salt reservoir.

Clause 13: The machine-readable medium of any one of clauses 9-12, wherein the instructions to configure the diffusion process include: instructions to input, into the diffusion process, sample images indicating the samples of the reservoir parameters, wherein the samples of the reservoir parameters have the probability distribution.

Clause 14: The machine-readable medium of any one of clauses 9-13 further comprising generating a generated image depicting the reservoir parameters in the subsurface space.

Clause 15: The machine-readable medium of any one of clauses 9-14, wherein the instructions to configure the diffusion process include: instructions to generate, by a neural network, a first noisy image by adding a first amount of noise to a sample seismic image, wherein the sample seismic image represents at least one of the reservoir parameters of the subsurface space, and wherein the at least one of the reservoir parameters in the sample seismic image has the probability distribution; instructions to determine, by the neural network, a first estimated amount of noise in the first noisy image; instructions to determine, by the neural network, a difference between the first estimated amount of noise and the first amount of noise; and instructions to update the neural network based on the difference.

Clause 16: The machine-readable medium of any one of clauses 9-15 further comprising: receiving a second seismic image in the neural network; and generating, based on the second seismic image and on the probability distribution of the reservoir parameters, a generative image indicating one or more of the reservoir parameters in the space relative to the borehole.

Clause 17: A system comprising: one or more processors; one or more machine-readable mediums including instructions, which when executed by the one or more processors, geologically characterize a subsurface space, the instructions comprising: instructions to configuring a diffusion process applied to information and data about samples of reservoir parameters; and instructions to determine, via the diffusion process, a probability distribution of the reservoir parameters in the subsurface space relative.

Clause 18: The system of clause 17, wherein the information and data include at least one or more geophysical data, borehole data, or geological information.

Clause 18: The system of any one of clauses 17-18, wherein the information and data include at least one or more geophysical data, borehole data, or geological information.

Clause 19: The system of any one of clauses 17-19, wherein the reservoir parameters include at least one of porosity, salt, saturation, permeability, or fault.

Clause 20: The system of any one of clauses 17-19, wherein the reservoir parameters relate to at least one of a hydrocarbon reservoir or a salt reservoir.

What is claimed is:

1. A method for controlling a computer to geologically characterize a space relative to a borehole, the method comprising:

configuring a diffusion process applied to information and data about samples of reservoir parameters; and determining, via the diffusion process, a probability distribution of the reservoir parameters in the space relative to the borehole.

2. The method of claim 1, wherein the information and data include at least one of geophysical data, borehole data, or geological information.

3. The method of claim 1, wherein the reservoir parameters include at least one of porosity, salt, saturation, permeability, or fault.

4. The method of claim 1, wherein the reservoir parameters relate to at least one of a hydrocarbon reservoir or a salt reservoir.

5. The method of claim 1, wherein configuring the diffusion process includes:

inputting, into a learning machine, sample images indicating the samples of the reservoir parameters, wherein the samples of the reservoir parameters have the probability distribution.

6. The method of claim 5, further comprising:

generating a generated image depicting the reservoir parameters in the space relative to the borehole.

7. The method of claim 1, wherein the configuring the diffusion process includes:

generating, by a neural network of the computer, a first noisy image by adding a first amount of noise to a sample seismic image, wherein the sample seismic image represents at least one of the reservoir parameters of the space relative to the borehole, and wherein the at least one of the reservoir parameters in the sample seismic image has the probability distribution;

determining, by the neural network, a first estimated amount of noise in the first noisy image;

determining, by the neural network, a difference between the first estimated amount of noise and the first amount of noise; and updating the neural network based on the difference.

8. The method of claim 7, further comprising:

receiving a second seismic image in the neural network; and generating, based on the second seismic image and on the probability distribution of the reservoir parameters, an output image indicating one or more of the reservoir parameters in the space relative to the borehole.

9. One or more non-transitory machine-readable storage mediums including instructions, which when executed by one or more processors, control a computer to geologically characterize a subsurface space, the instructions comprising:

instructions to configure a diffusion process applied to information and data about samples of reservoir parameters; and instructions to determine, via the diffusion process, a probability distribution of the reservoir parameters in the subsurface space.

10. The one or more non-transitory machine-readable storage mediums of claim 9, wherein the information and data include at least one or more geophysical data, borehole data, or geological information.

11. The one or more non-transitory machine-readable storage mediums of claim 9, wherein the reservoir parameters include at least one of porosity, salt, saturation, permeability, or fault.

12. The one or more non-transitory machine-readable storage mediums of claim 9, wherein the reservoir parameters relate to at least one of a hydrocarbon reservoir or a salt reservoir.

13. The one or more non-transitory machine-readable storage mediums of claim 9, wherein the instructions to configure the diffusion process include:

instructions to input, into the diffusion process, sample images indicating the samples of the reservoir parameters, wherein the samples of the reservoir parameters have the probability distribution.

14. The one or more non-transitory machine-readable storage mediums of claim 13, further comprising:

generating a generated image depicting the reservoir parameters in the subsurface space.

15. The one or more non-transitory machine-readable storage mediums of claim 9, wherein the instructions to configure the diffusion process include:

instructions to generate, by a neural network, a first noisy image by adding a first amount of noise to a sample seismic image, wherein the sample seismic image represents at least one of the reservoir parameters of the subsurface space, and wherein the at least one of the reservoir parameters in the sample seismic image has the probability distribution;

instructions to determine, by the neural network, a first estimated amount of noise in the first noisy image;

instructions to determine, by the neural network, a difference between the first estimated amount of noise and the first amount of noise; and instructions to update the neural network based on the difference.

16. The one or more non-transitory machine-readable storage mediums of claim 9, further comprising:

receiving a second seismic image in the neural network; and generating, based on the second seismic image and on the probability distribution of the reservoir parameters, a generative image indicating one or more of the reservoir parameters in the subsurface space.

17. A system comprising:

one or more processors;

one or more machine-readable mediums including instructions, which when executed by the one or more of the processors, to control the one or more processors to geologically characterize a subsurface space, the instructions comprising:

instructions to configure a diffusion process applied to information and data about samples of reservoir parameters; and instructions to determine, via the diffusion process, a probability distribution of the reservoir parameters in the subsurface space.

18. The system of claim 17, wherein the information and data include at least one or more of geophysical data, borehole data, or geological information.

19. The system of claim 17, wherein the reservoir parameters include at least one of porosity, salt, saturation, permeability, or fault.

20. The system of claim 17, wherein the reservoir parameters relate to at least one of a hydrocarbon reservoir or a salt reservoir.

* * * * *